United States Patent
Mak et al.

(10) Patent No.: US 6,851,028 B1
(45) Date of Patent: Feb. 1, 2005

(54) SYSTEM AND METHOD FOR PROCESSING MEMORY REQUESTS

(75) Inventors: Kwok Ken Mak, Chapel Hill, NC (US); Kenneth M. Key, Raleigh, NC (US); Xiaoming Sun, Chapel Hill, NC (US); L. Duane Richardson, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 10/035,609

(22) Filed: Dec. 28, 2001

(51) Int. Cl.[7] .............................................. G06F 13/00
(52) U.S. Cl. ..................... 711/154; 711/100; 709/200
(58) Field of Search ................................ 711/100, 117, 711/154, 118; 710/1; 709/200, 223; 712/2

(56) References Cited

U.S. PATENT DOCUMENTS

| | | | |
|---|---|---|---|
| 5,627,994 A | * | 5/1997 | Levy et al. ................ 711/150 |
| 5,745,694 A | * | 4/1998 | Egawa et al. ................ 709/225 |
| 5,961,628 A | * | 10/1999 | Nguyen et al. ................ 712/2 |
| 5,982,655 A | | 11/1999 | Doyle |
| 6,026,464 A | | 2/2000 | Cohen |
| 6,148,347 A | | 11/2000 | Finch et al. |
| 6,161,161 A | | 12/2000 | Botkin et al. |
| 6,229,727 B1 | | 5/2001 | Doyle |
| 6,330,445 B1 | | 12/2001 | Skog et al. |

* cited by examiner

Primary Examiner—Tuan V. Thai
(74) Attorney, Agent, or Firm—Cesari and McKenna, LLP; A. Sidney Johnston (57) ABSTRACT

The present invention incorporates a technique that enables the processing of memory requests without requiring memory devices that support a request identifier (ID). The present invention maintains an association between a request identifier and a first memory request issued by a requestor and directed to a memory location. The first memory request contains an address corresponding to the memory location. A memory device corresponding to the address is selected. A second memory request without the identifier is issued to the selected memory device to access information stored at the location. The information is received from the memory device and associated with the request identifier.

20 Claims, 6 Drawing Sheets

SYSTEM AND METHOD FOR PROCESSING MEMORY REQUESTS

BACKGROUND OF THE INVENTION

1. Field of the Invention

This invention relates to memory controllers and specifically to a technique for processing memory requests.

2. Background Information

Networking devices, such as routers and switches, often employ the use of a central processing unit (processor) to implement various functions supported by the networking device. Information, such as data and instructions, used by the processor is ususally kept in a memory subsystem that is typically connected to the processor via a communication bus. The memory subsystem often comprises a memory controller (controller) and a plurality of memory devices, such as random access memory (RAM). The memory controller acts as an interface between the memory devices and the processor and is typically configured to process memory requests issued by the processor. A memory request is a request that directs the memory controller to read or write information in the memory devices. A typical memory request contains an address that is used by the controller to determine the location of the information in the memory devices.

Advances in processor technology have led to the development of very high speed processors that are capable of operating at speeds much faster than the memory devices employed by the memory subsystem. As a consequence, the processor may become stalled while waiting for memory requests to complete, thus leading to a significant performance bottleneck between the processor and the memory subsystem. To avoid this bottleneck, systems are often designed to handle the processing of memory requests in an "out-of-order" fashion. Out-of-order processing means that requests may be processed in an order that is different than the order in which the requests were received. In other words, in a system that implements out-of-order processing, the results of requests are returned when the results are available and not necessarily in the order in which the requests were issued.

For example, assume a system that allows out-of-order processing comprises a processor connected to a memory subsystem that further comprises a memory controller and a plurality of memory devices. Further assume the processor issues two requests to read information located on two different memory devices and that the memory device associated with the first issued request is not available (i.e., not capable of servicing a request), whereas the memory device associated with the second issued request is available (i.e., capable of servicing a request). The memory controller processes the second request ahead of the first because the memory device associated with the second request is able to take the request immediately, whereas the memory device associated with the first request is not. All other things being equal, the results (i.e., information read) for the second request will likely be available ahead of the results for the first request, and since out-of-order processing is allowed, the results for the second request will be returned to the processor ahead of the results of the first request.

Systems that implement out-of-order processing typically track requests to match-up results with a particular request. One scheme often employed to track requests is to tag the request with a unique identifier, sometimes called a request identifier. In such schemes, the identifier is often assigned by the requestor. The identifier follows the request through the system and eventually is returned to the requestor along with the results of the request. The requestor can then use the identifier to match requests with results and perform whatever additional processing may be necessary, such as re-ordering results.

One problem associated with this scheme is that the entire system including the memory devices needs to be designed to accommodate the unique identifier. This may preclude the use of certain types of memory devices, such as certain standard "off-the-shelf" memory devices, as these devices may not be capable of accommodating the unique identifier. It would be desirable to have a simple yet effective technique for processing memory requests in a system that supports out-of-order processing that does not require the memory devices support a request identifier.

SUMMARY OF THE INVENTION

The present invention comprises a technique that simplifies a system configured to support out-of-order processing of memory requests, by obviating the requirement that memory devices servicing each request support a request identifier. The inventive technique associates a request identifier with a particular memory device that is servicing the request, thus enabling results of the request to be matched to a request identifier and, hence, a specific memory request. The technique of the present invention takes advantage of the fact that the memory device processes requests and returns results in a strict order, that is, in the order in which the requests are received.

Broadly stated, the technique employed by the present invention is as follows:

1. a first request, containing an address of a memory location, is associated with a request identifier;
2. the address is used to select a memory device that contains the memory location corresponding to the address;
3. a second memory request without the request identifier is issued to the selected memory device; and
4. the results returned from the selected memory device are associated with the request identifier.

Associating the results to the request identifier enables the results to be re-ordered in the order the first requests were issued, thereby accommodating out-of-order processing of memory requests. Advantageously, using the technique employed by the present invention, this association can be made without requiring the memory devices support a request identifier.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
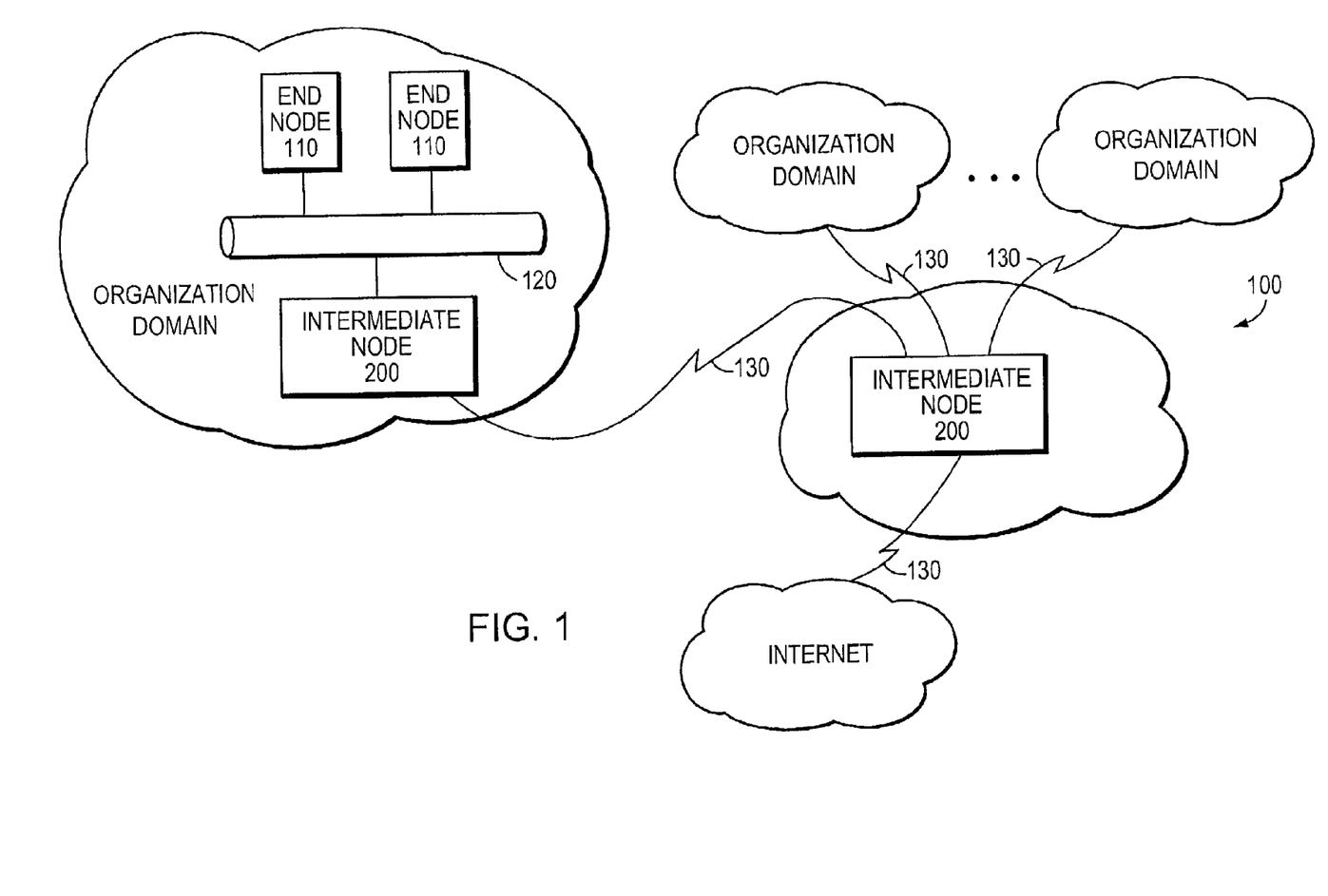
FIG. 1 is a schematic block diagram of a network including a collection of communication links and segments connected to a plurality of end and intermediate nodes.

FIG. 1 is a schematic block diagram of a computer network 100 comprising a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 2:
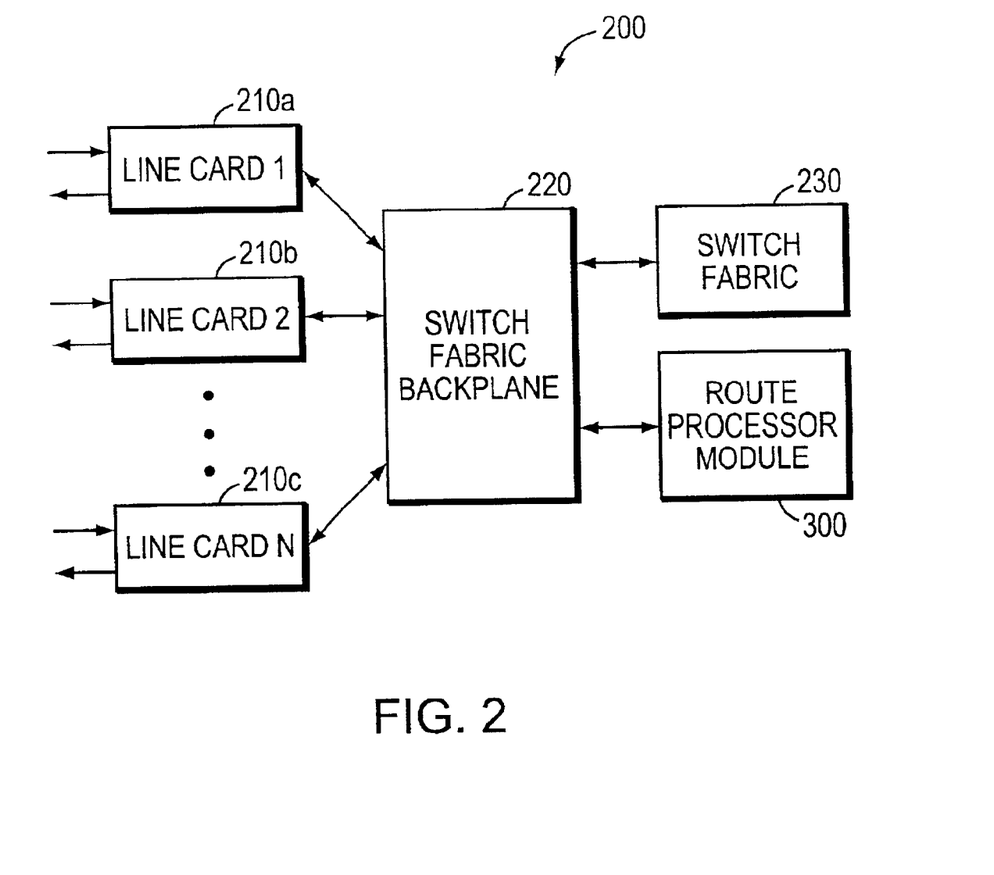
FIG. 2 is a partial schematic block diagram of an intermediate node that can advantageously implement the present invention.

FIG. 2 is a partial block diagram of a typical intermediate node (switch) 200 that can advantageously implement the present invention. An example of an intermediate node 200 that could be used in the computer network 100 is the Cisco MGX 8850 IP+ ATM Multiservice Switch, available from Cisco Systems, Incorporated, San Jose, Calif. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, DSL aggregation, ATM service backbones and Virtual Private Networks (VPN's). The intermediate node 200 comprises a plurality of cards including line cards 210, a switch fabric card 230 and a route processor module 300 card interconnected by a switch fabric backplane 220.

The line cards 210 connect (interface) the switch 200 with the network 100. To that end, the line cards 210 receive and transmit data over the network using various protocols, such as OC48c, DS0, T3 and so on. The line cards 210 are also coupled to the is switch fabric backplane 220 and forward data received from the network to the switch fabric backplane 220, as well as transmit data received from the switch fabric backplane 220 to the network.

The switch fabric backplane 220 comprises logic and a backplane that provides an interface between the line cards 210, the switch fabric card 230 and the route processor module card 300. For example, the switch fabric backplane 220 provides interconnections between the cards that allow data and signals to be transferred from one card to another.

The switch fabric card 230 is coupled to the switch fabric backplane 220 and comprises switch fabric logic (switch fabric) that is configured to switch data between ports located on the cards coupled to the switch fabric backplane 220. For example, data is sent from a given port to the switch fabric card 230. The switch fabric card 230 applies the data to the switch fabric logic and selects a destination port. The data is then switched to the destination port.

Figure 3:
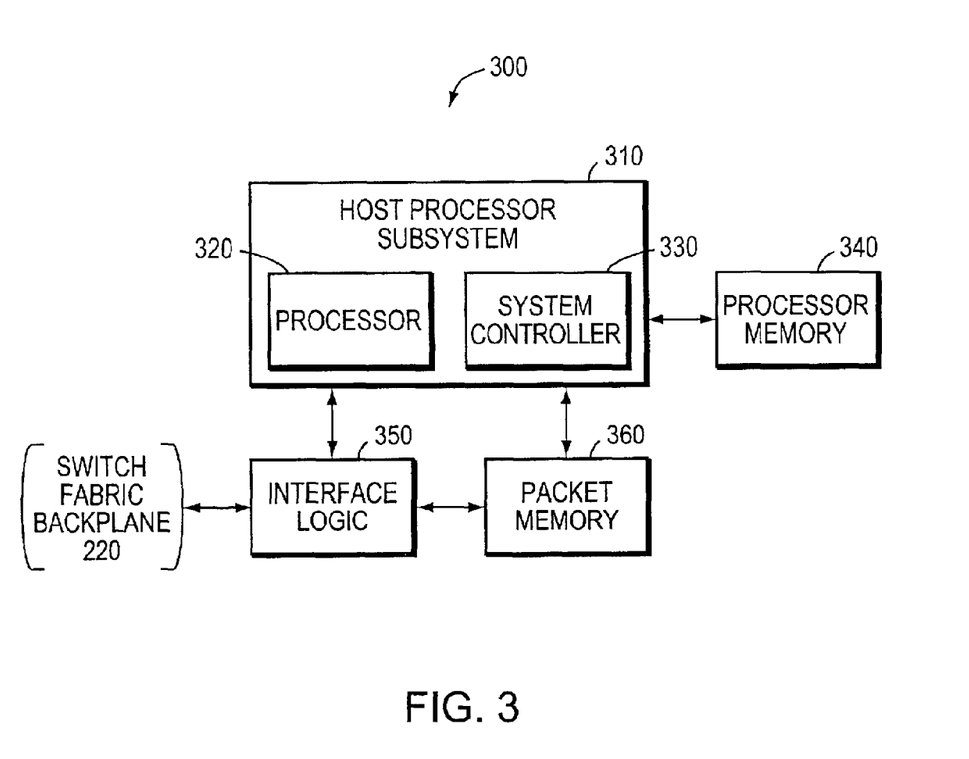
FIG. 3 is a partial schematic block diagram of a route processor module that can advantageously implement the present invention.

The route processor (RP) module 300 is coupled to the switch fabric backplane 220 and is adapted to provide layer 3 processing for incoming packets. FIG. 3 is a partial block diagram of the route processor module 300 comprising a host processor 310 subsystem, processor memory 340, interface logic 350 and packet memory 360. The host processor 310 further comprises one or more processors 320 coupled to a system controller 330. These processors 320 comprise processing elements and logic that are capable of executing instructions and generating memory requests, such as the MIPS 10000 processor available from Silicon Graphics Incorporated, Mountain View, Calif. The system controller 330 is preferably embodied in a high performance Application Specific Integrated Circuit (ASIC) which is configured to interface the processors 320 with the processor memory 340 and the packet memory 360.

The processor memory 340 holds executable instructions and data that are used by the processors 320 and enable (adapt) the processors 320 to perform various functions. These functions include processing packets located in the packet memory 360.

The interface logic 350 comprises hardware logic that, among other things, provides an interface between the switch fabric backplane 220 (FIG. 2), the packet memory 360 and the host processor 310.

The packet memory 360 comprises memory devices 485 (FIG. 4) capable of storing packets received by the interface logic 350. Preferably, these memory devices 485 are industry standard high-speed memory storage devices, such as Rambus Dynamic Random Access Memory (RDRAM) devices available from Rambus, Inc., Los Altos, Calif.

Broadly stated, packets are received from the network 100 by the line cards 210 and sent to over the switch fabric backplane 220 to the switching fabric 230 for further processing. The switching fabric 230 examines header information contained in the packets and forwards the packets to the appropriate card coupled to the switch fabric backplane 220. Packets destined for the route processor module 300 are received by the interface logic 350 and placed in the packet memory 360. The interface logic 350 informs the host processor 310 of the arrival of a packet. The processors 320 process the packet in part by issuing requests to the system controller 330 to access the packet data stored in the packet memory 360.

Figure 4:
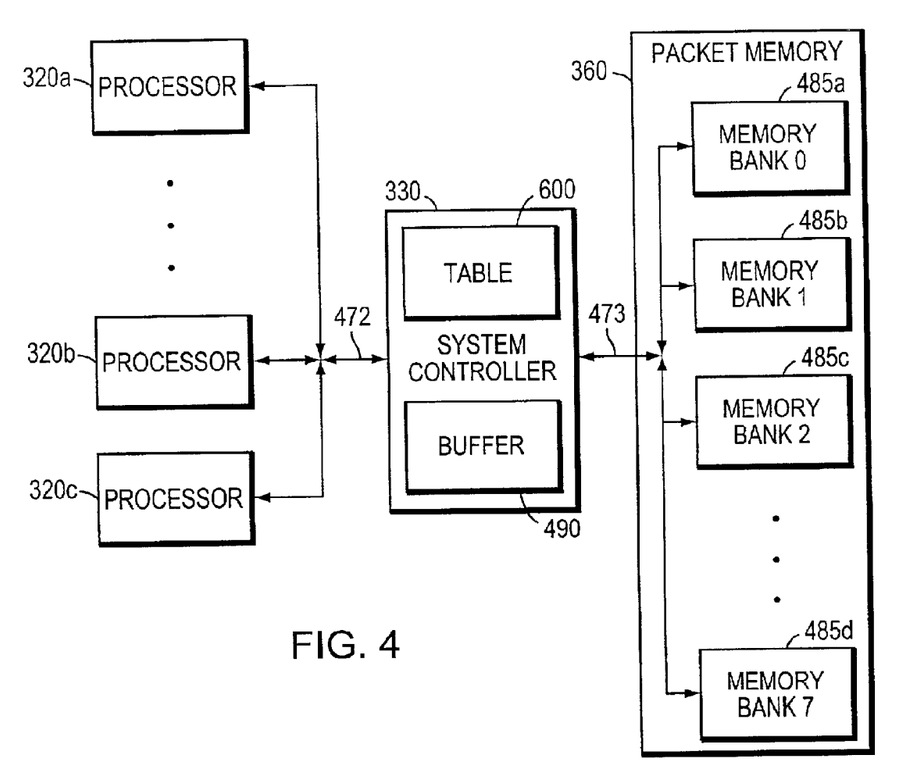
FIG. 4 is a high-level schematic block diagram of the interface between a host processor and a packet memory that can be advantageously used to implement the present invention.

FIG. 4 is a high-level block diagram of the interface between the processors 320, the system controller 330 and the packet memory 360 that can be advantageously used to implement the present invention. This interface includes a processor communication bus 472 and a packet memory interface 473. The processor communication bus 472 enables communication between the processors 320 and the system controller 330. Preferably, the processor communication bus 472 is a shared parallel bus that interfaces one or more ports located on each of the processors 320 to the system controller 330. The packet memory interface 473 enables communication between the system controller 330 and the memory devices 485.

The processor communication bus 472 is a communication bus that includes data and control signals that enable devices attached to the bus (e.g., processors) to exchange control and data information with the system controller 330. Preferably, these signals include a request identifier (ID), a port of origin, a data size, a memory address and memory data, though other signals such as status information may be included as well. The processor communication bus 472 is a communications interface that enables the processors 320 to issue requests to the system controller 330 and the system controller 330 to return responses to those requests to the processors 320.

The packet memory interface 473 is a memory interface that includes data and control signals that enable the system controller 330 to exchange control and data information with the memory devices 485. Preferably, the packet memory interface 473 includes signals that enable the system controller 330 to select a particular memory device 485, determine if the selected device is available (i.e., able to service a request) and transfer data to and from the selected device.

The packet memory 360 preferably comprises a series of standard memory devices 485 arranged as a series of memory banks, such that a range of addresses is associated with each memory device 485. Each memory device 485 operates on a strict order basis, that is, results to requests sent to the memory device 485 are returned in the order in which the requests were received. Preferably, each memory device 485 is configured to process a 32-byte block of data for each request sent to the device 485.

In the preferred embodiment, the range of addresses associated with each memory device 485 are interleaved such that a memory device 485 is associated with every Nth address where N is the number of devices interleaved (e.g., N equals the number of memory devices). However, this is not a requirement of the invention. Rather, other addressing schemes could be used. For example, the range of address associated with a particular memory device 485 could be a contiguous range of addresses.

Figure 5:
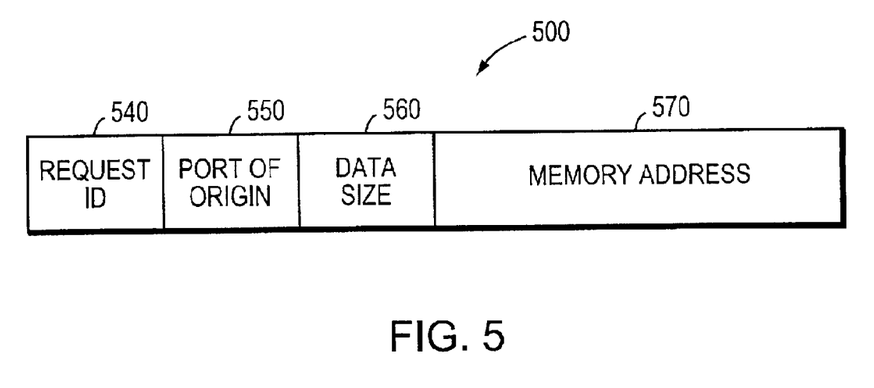
FIG. 5 is a schematic block diagram of a memory request that can be advantageously used with the present invention.

FIG. 5 is an illustration of a memory request 500 that can be advantageously used with the present invention. The memory request 500 preferably comprises a request ID field 540, a port of origin field 550, a data size field 560 and an address field 570. The memory request 500 is sent over the communication bus 472 from the processor 320 to the system controller 330 to request data from the packet memory 360.

The request ID field 540 is preferably a 16-bit field that holds a request identifier (ID) value that identifies the request. Preferably, the request ID value is a number assigned by the processor 320 that uniquely identifies the request. This number could be generated, for example, using a modulo counter that counts up to the maximum number of outstanding requests. Likewise, the number could be generated using, for example, a pseudo-random number generator that repeats its sequence at an interval that is greater or equal to than the maximum number of outstanding requests.

The port of origin field 550 is preferably an 8-bit field that holds a port value that identifies the port associated with the requestor (e.g., processor) that originated the request. This value identifies the source of the request. Preferably, the port value is a unique value for each port on the communication bus 472.

The data size field 560 holds a value that indicates the amount of memory data requested. Preferably, this field is an 8-bit field that indicates the number of 32-byte data blocks to be transferred.

The address field 570 holds the starting memory address associated with the request. Preferably, this field is a 24-bit field that indicates the starting 32-byte aligned block address in the packet memory 360.

Figure 6:
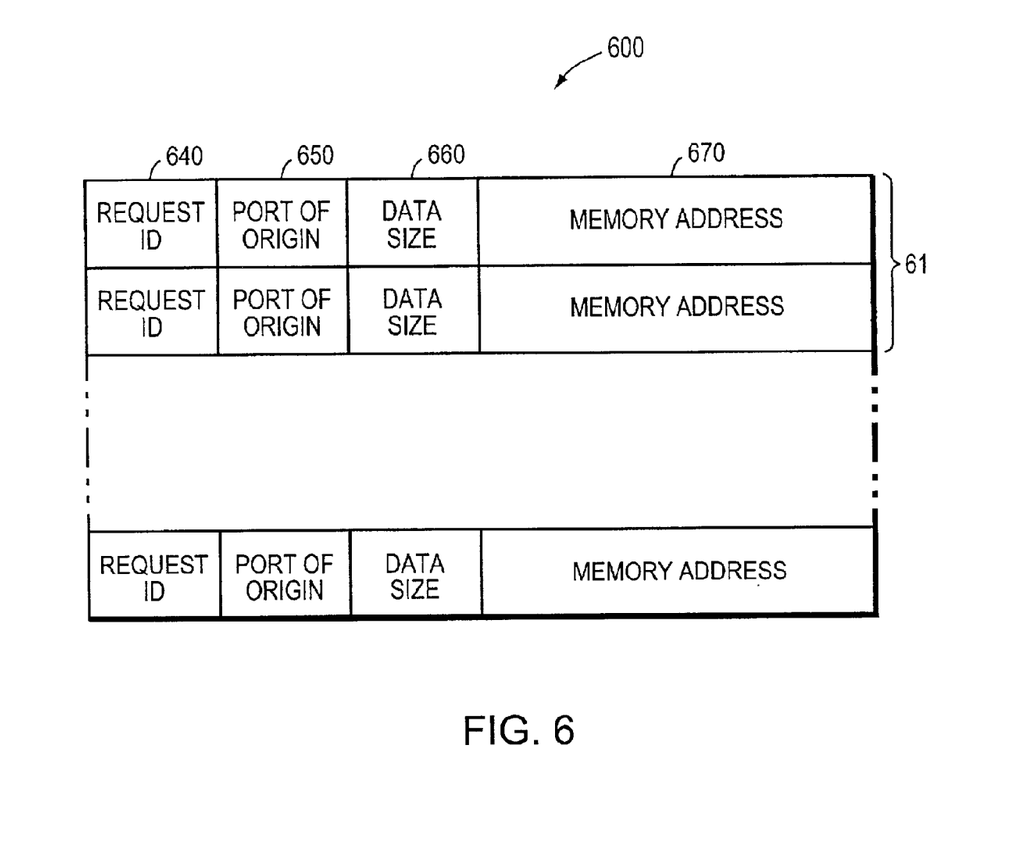
FIG. 6 is a block diagram of a table that can be advantageously used with the present invention.

The system controller 330 further comprises a table 600 and a buffer 490. The table 600 is configured to hold requests received by the processors 320. The buffer 490 is configured to hold data received from the memory devices 485.

To transfer data from the memory 360 to a processor 320, the processor 320 typically creates a memory request 500 and specifies the starting address of the data in the address field 570 and the number of 32-byte blocks to transfer in the data size field 560 of the request 500. Moreover, the processor 320 specifies a port identifier (ID) associated with the processor in the port of origin field 550 to designate the port that is to receive the results of the request 500. Next, the processor 320 associates the request 500 to a request identifier (ID) by generating a request ID value and placing that value in the request ID 540 field of the memory request 500. The request 500, is then issued to the system controller 330 by sending the request over the communication bus 472 from the processor 320 to the system controller 330. The system controller 330 receives the request 500 and places a copy of the request 500 preferably, in a table 600, though other means such as a register or series of registers could be used.

FIG. 6 is an illustration of a table that can be advantageously used with the present invention. The table is illustratively organized as a series of entries 610, each of which preferably contains a request ID field 640, a port of origin field 650, a data size field 660 and an address field 670. The request ID field 640 holds the value of the request ID 540, the port of origin field 650 holds the value of the port of origin 550, the data size field 660 holds the value of the data size 560 and the address field 670 holds the value of the address 570 contained in the request 500. It should be noted that in other embodiments of the invention, an entry 610 may contain other information such as a device identifier field (resource D) that identifies the memory device 485 (FIG. 4) associated with the request, or a time stamp field that denotes when the request was received.

On receipt of the request 500, the system controller 330 extracts the request ID 540, port of origin 550, data size 560 and address 570 information from the request 500 and saves this information in the next available entry 610 in the table 600. The controller 330 then selects the appropriate memory device 485 based on the address information 570 and checks the status of the selected memory device 485 to determine if it is available. If the device 485 is not available, the request is held by the controller 330. If the device 485 is available, for each 32-byte block of data represented in the data size field 560, the controller 330 issues a second memory request by sending the second res quest over the memory interface 473 to the selected device 485 to transfer the 32-byte block of data from the memory 360. As each 32-byte block of data is returned from the device 485, the controller 330 places the data in the buffer 490.

When all of the data requested in the memory request 500 has been transferred from the packet memory 360 to the buffer 490, the controller 330 associates the data (information) with the request ID of the request 500 by searching the table 600 for the earliest entry 610 whose address field value 670 is associated with the device 485. When a matching entry is found, the controller 330 uses information in the entry to communicate the results over the processor communication bus 472 to the processor 320.

In one embodiment of the invention, the port of origin 650 is used to select the processor 320 that is to receive the results. In this embodiment, the port of origin value 650 is placed on the communication bus 472 to select the receiving port on the target processor 320 that is to receive the results. Once the receiving port is selected, the data is transferred from the buffer 490 to the receiving port.

In another embodiment of the invention, the request ID 640 is used to select the processor 320 that is to receive the results. In this embodiment, the request ID is placed on the communication bus 472 and the processors 320 are configured to recognize the request IDs receive the results, accordingly.

In summary, the novel technique employed by the present invention for processing a memory request does not require that a memory device support a request identifier. The present invention maintains the association between the identity of a memory request and the identity of the memory device that services the request. In so doing, the memory device need not be aware of the identity of the request The invention has been described in an embodiment whereby memory requests issued by a requester (e.g., a processor) are tagged with a request ID. In this embodiment, the request is tagged by having the requester generate the request ID and place the request ID in the request ID field of the memory request. Essentially, the requestor associates the request ID with the memory request. However, this is not a limitation of the invention. Rather, in an alternative embodiment of the invention, requests sent by the requestor are not tagged with a request ID. In this embodiment, when a memory request is received by the system controller, the controller generates the request ID and associates the generated ID with the request.

Likewise, the invention has been described in an embodiment where the requests issued by the requestor contain port of origin and data size information. This too is not a requirement of the invention. Rather, in alternate embodiments of the invention, the port of origin and/or data size information is omitted.

In addition, the illustrated embodiment is described in a manner where the memory devices comprise high speed random access memory devices, such as RDRAM. However, this is also not a limitation of the invention. Rather, other memory devices, such as synchronous dynamic random access memory (SDRAM) devices or disk units, could be used, provided they return results in the same order as the memory requests.

It should be noted that the technique employed by the present invention could be used in an embodiment to support out-of-order processing of memory requests that span multiple memory devices. In such an embodiment, the first memory request, issued by the requester, is broken up into a series of "first requests" that in turn are used to generate second memory requests that are issued to the appropriate memory devices. A separate entry in the table is created for each first request in the series. The system controller holds the results returned by each memory device preferably in the buffer. When all of the results have been returned, the controller organizes the results and returns them back to the requestor that issued the first memory request.

It should be further noted that in the preferred embodiment, the devices that generate the memory requests (requesters) are processors such as, a MIPS processor as indicated above. However, this is not a limitation of the invention. Rather, the invention can be used with other devices attached to the communication bus that are capable of generating memory requests, such as a Direct Memory Access (DMA) engine.

The illustrated embodiment of the present invention is described in a manner that would enable one skilled in the art to implement the present invention in hardware. However, this too is not a limitation of the invention. The described technique employed by the present invention can be implemented in whole or in part in computer readable and executable program instructions using techniques known to those skilled in the art of software development. For example, in one embodiment of the invention functions provided by the system controller are implemented as a software process that runs under control of an operating system. Memory requests are be sent by a requestor to the process using well known communication techniques for interprocess communication. The process processes the request in the manner described above and communicates the results returned from the memory devices to the requester using well known communication techniques for interprocess communication. The functions provided by the software process are implemented using computer executable instructions and data structures that are typically resident in a computer memory and executed on a processor. It will be apparent to those skilled in the art that other memory means, including various computer readable media, may be used for storing and executing program instructions pertaining to the described mechanism and technique.

Advantageously, the inventive technique described herein enables out-of-order processing of memory requests without requiring that a request ID be maintained throughout the memory subsystem. The inventive technique enables the use of standard memory devices that are capable of returning results in a strict order, that is, in the same order as requested. Moreover, the inventive technique can be used with memory devices where out-of-order operation is tracked using a resource ID, such as memory devices that utilize a bank ID to identify a memory bank within the device. The advantages provided by the described inventive technique includes a reduction in the amount of logic and programming necessary to support out-of-order memory operation.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for processing a first memory request issued by a requestor and directed to a location in a memory, the first memory request containing an address corresponding to the memory location, the method comprising the steps of:
   (A) associating the first memory request with a request identifier;
   (B) selecting a memory device containing the memory location corresponding to the address;
   (C) issuing a second memory request without the request identifier to the memory device to access information stored at the location;
   (D) receiving the information from the memory device; and
   (E) associating the information with the request identifier.

2. The method of claim 1 wherein the first memory request further contains the request identifier.

3. The method of claim 1 wherein the step of associating the first memory request with a request identifier further comprises the step of:
   generating the request identifier.

4. The method of claim 1 further comprising the steps of:
   determining if the memory device is available; and
   performing steps C through E if the memory device is available.

5. The method of claim 1 further comprising the step of:
   saving the address value and the request identifier.

6. The method of claim 1 wherein the requester is a processor.

7. An apparatus for processing a first memory request issued by a requestor and directed to a location in a memory, the first memory request containing an address corresponding to the memory location, the apparatus comprising:

means for associating the first memory request with a request identifier;

means for selecting a memory device containing the memory location corresponding to the address;

means for issuing a second memory request without the request identifier to the memory device to access information stored at the location;

means for receiving the information from the memory device; and means for associating the information with the request identifier.

8. The apparatus of claim 7 wherein the first memory request contains:

the request identifier.

9. The apparatus of claim 7 further comprising:

means for determining if the memory device is available.

10. The apparatus of claim 7 further comprising:

means for saving the request identifier.

11. The apparatus of claim 10 wherein the request identifier is saved in an entry in a table.

12. The apparatus of claim 7 wherein the first memory request contains a port of origin.

13. The apparatus of claim 7 wherein the requestor is a processor.

14. A circuit for processing a first memory request issued by a requestor and directed to a location in a memory, the memory comprising one or more memory devices, the first memory request containing an address corresponding to the memory location, the circuit comprising:

a system controller connected to the requestor and the memory, the system controller configured to receive the first memory request from the requester, associate the first memory request with a request identifier and in response to the first memory request, select one or more memory devices and issue one or more second memory requests without the request identifier to each of the selected memory devices.

15. The apparatus of claim 14 wherein the system controller further comprises:

a table comprising one or more entries, each entry formatted with a request identifier field and an address field, the request identifier field holding the request identifier and the address field holding the address.

16. The circuit of claim 14 wherein the requestor is a processor.

17. An intermediate node configured to process a first memory request directed to a location in a memory, the memory comprising one or more memory devices, the first memory request containing an address corresponding to the memory location, the intermediate node comprising:

a requestor configured to issue the first memory request;

a system controller coupled to the requestor, the system controller configured to receive the first memory request, associate the first memory request with a request identifier and in response to the first memory request select one or more memory devices and issue one or more second memory requests without the request identifier to each of the selected memory devices; and one or more memory devices coupled to the system controller, the memory devices configured to receive the one or more second memory requests and return information in response to the second memory requests.

18. The intermediate node of claim 17 wherein the system controller further comprises:

a table comprising one or more entries, each entry formatted with a request identifier field and an address field, the request identifier field holding the request identifier and the address field holding the address.

19. The intermediate node of claim 17 wherein the requestor is a processor.

20. A computer readable medium comprising computer executable instructions for performing method recited in claim 1, 3, 4 or 5.

* * * * *